US008527383B2

(12) United States Patent
Rio et al.

(10) Patent No.: US 8,527,383 B2
(45) Date of Patent: Sep. 3, 2013

(54) STANDARDIZATION AND MANAGEMENT OF OVER-THE-COUNTER FINANCIAL INSTRUMENTS

(75) Inventors: Stephane Rio, Soisy sur Seine (FR); Sven Miserey, London (GB)

(73) Assignee: Chicago Mercantile Exchange, Inc., Chicago, IL (US)

( * ) Notice: Subject to any disclaimer, the term of this patent is extended or adjusted under 35 U.S.C. 154(b) by 857 days.

(21) Appl. No.: 12/021,568

(22) Filed: Jan. 29, 2008

(65) Prior Publication Data
US 2008/0183615 A1 Jul. 31, 2008

Related U.S. Application Data

(60) Provisional application No. 60/887,237, filed on Jan. 30, 2007.

(51) Int. Cl.
*G06Q 40/00* (2006.01)

(52) U.S. Cl.
USPC ............................................. 705/35; 705/37

(58) Field of Classification Search
USPC .......................................................... 705/35
See application file for complete search history.

(56) References Cited

U.S. PATENT DOCUMENTS

| 2003/0229571 | A1* | 12/2003 | May .................................. 705/37 |
| 2004/0024692 | A1 | 2/2004 | Turbeville et al. |
| 2006/0059068 | A1* | 3/2006 | Glinberg et al. ................. 705/35 |
| 2006/0253376 | A1* | 11/2006 | Seale et al. ....................... 705/37 |
| 2007/0022037 | A1 | 1/2007 | Pechenik et al. |
| 2007/0055609 | A1 | 3/2007 | Whitehurst et al. |
| 2007/0288351 | A1 | 12/2007 | Huntley |
| 2008/0065562 | A1* | 3/2008 | Rio ............................. 705/36 R |
| 2008/0167981 | A1* | 7/2008 | Whitehurst et al. ............ 705/37 |
| 2008/0183615 | A1 | 7/2008 | Rio et al. |

OTHER PUBLICATIONS

Brown, Keith and Donald Smith, 1993, Default Risk and Innovations in the Design of Interest Rate Swaps, Financial Management 22, 1993, 94-105.
Brown, Keith and Donald Smith, 1995, Interest Rate and Currency Swaps: A Tutorial, The Research Foundation of the Institute of Chartered Financial Analysts, Charlottesville, Virginia.
U.S. Appl. No. 11/852,445, pending, Rio.
International Preliminary Report on Patentability in PCT Application No. PCT/IB2007/004336 dated Aug. 27, 2009.

* cited by examiner

*Primary Examiner* — Ella Colbert
*Assistant Examiner* — John Anderson
(74) *Attorney, Agent, or Firm* — Brinks Hofer Gilson & Lione (57) ABSTRACT

A method of managing financial products is disclosed. The method includes receiving transaction parameters associated with a financial transaction, determining a standardized financial product, wherein the standardized financial transaction reflects the transaction parameters associated with the financial position, calculating a net present value position between the financial position and the standardized financial product, and clearing the net present value position through a clearing party.

15 Claims, 9 Drawing Sheets

|      | 1 y       $C_a$ |
|------|-----------------|
| 1 y  | 100 →           |
| 2 y  | 250 ←           |
| 3 y  | 100 →           |
| -    | -               |
| -    | -               |
| 50 y | 250 ←           |

STANDARDIZATION AND MANAGEMENT OF OVER-THE-COUNTER FINANCIAL INSTRUMENTS

CROSS-REFERENCE TO RELATED APPLICATIONS

This patent claims the priority benefit under 35 U.S.C. §119(e) of pending U.S. provisional patent application Ser. No. 60/887,237 (04672-00631), filed on Jan. 30, 2007. The content of this provisional patent application is incorporated herein by reference for all purposes.

TECHNICAL FIELD

This patent generally relates to processes and methods of managing and clearing financial instruments, and more specifically to managing and clearing standardized over-the-counter products such as interest rate swaps.

BACKGROUND

Over-the-counter (OTC) derivative products, such as negotiable financial instruments, generally refer to custom-tailored, negotiated contracts such as, for example, derivatives of stocks, commodities, securities, interest rates, indices, futures and forwards, options and foreign currencies which are bought and sold directly between parties. Transactions related to these financial instruments may be considered over the counter since they are not exchange traded and the instruments are not generally exchange listed. Over-the-counter OTC financial products may be negotiated or otherwise defined to address the needs and desires of the parties in an attempt to mitigate their individual exposure or liability to risk, or in an effort to maximize or control their individual cash-flows.

Regardless of the objective, an exchange of over-the-counter products, like entrance into any contract, processing of the transaction, and post-transaction administration, may require the parties to expend substantial effort and resources to monitor and ensure compliance throughout the life term of the contract or product. Depending upon the duration, complexity and number of contracts or over-the-counter products within a party's portfolio, this monitoring may be complicated and require a great deal of substantial effort.

It would be desirable to provide processes and methods for monitoring, managing and clearing custom-tailored contracts or over-the-counter financial products.

SUMMARY

Processes and methods for monitoring, managing and servicing over-the-counter products such as, for example, interest rate swap (IRS) transactions are disclosed. The disclosed processes and methods are not limited to IRS transactions or any particular pre-defined and/or standardized over-the-counter financial products or instruments. Instead, the processes and methods may be generally applied to any wide variety of negotiable financial instruments and investment vehicles.

In one embodiment, a method of managing financial products is disclosed. The method includes receiving transaction parameters associated with a financial transaction, determining a standardized financial product, wherein the standardized financial transaction reflects the transaction parameters associated with the financial position, calculating a net present value position between the financial position and the standardized financial product, and clearing the net present value position through a clearing party.

In another embodiment, a method of managing financial products is disclosed. The method includes defining one or more transaction parameters associated with a financial transaction, identifying an exchange traded financial product, wherein the exchange traded financial product reflects the defined one or more transaction parameters associated with the financial transaction, calculating a net present value position between the financial transaction and the exchange traded financial product, and clearing the net present value position through a clearing party.

In another embodiment, a method of managing financial products is disclosed. The method includes defining at least one transaction parameter on a first date, wherein the at least one transaction parameter is associated with a first transaction, identifying a second transaction, wherein the second transaction begins on a second date, and where the second transaction reflects the at least one transaction parameters associated with the first transaction, calculating a net present value position between the first transaction on the first date and the second transaction on the second date, and clearing the net present value position through a clearing party.

Other embodiments are disclosed, and each of the embodiments can be used alone or together in combination. Additional features and advantages of the disclosed embodiments are described in, and will be apparent from, the following Detailed Description and the figures.

DETAILED DESCRIPTION

I. Exchange Traded Over-The-Counter Products

Exchange traded over-the-counter (OTC) derivative products, investment vehicles, and/or transactions are generally bi-lateral contracts based on known OTC derivative products in which two parties agree on how a particular trade or agreement is to be settled. The OTC derivative product may be a financial instrument or investment vehicle that is bought, sold, traded, exchanged, and/or swapped between counter-parties. The OTC derivative product may have a term and may be settled at some point in the future. Exchange traded overthe-counter derivative products may include a wide variety of transaction parameters designed and tailored to the particular requirements or specifications of the individual parties. OTC derivatives in general, and exchange traded OTC derivative products specifically, exist to fill a wide range of needs for counterparties, including limiting or mitigating exposure to risks and/or maximizing cash flow. These contracts can include a variety of provisions or transaction parameters ranging from delivery locations, quality specifications, settlement and alternatives and can be structured to correlate as closely as possible to the customer's price, volume, pricing, borrowing rate, transportation and/or other requirements.

A. Interest Rate Swaps

One specific example of an OTC derivative product is an interest rate swap (IRS) transaction. With an interest rate swap, parties agree to exchange streams of future interest payments based on a specified principal or notional amount. Types of IRS transactions or contracts include: an exchange of interest streams where one stream is based on a floating rate and the other interest stream is based on a fixed rate and/or an exchange of two interest streams based floating rates having different underlying indices. Each stream may be referred to as a leg. Swaps are often used to hedge certain risks, for instance, interest rate risk. They can also be used for speculative purposes.

An example of a swap includes a plain fixed-to-floating, or "vanilla," interest rate swap. The "vanilla" or exemplary interest rate swap includes an exchange of interest streams where one stream is based on a floating rate and the other interest stream is based on a fixed rate in the same currency. In the exemplary swap, one party makes periodic interest payments to the other based on a variable interest rate. The variable rate may be linked to a periodically known or agreed upon rate for the term of the swap such as the London Interbank Offered Rate (LIBOR). In return for the stream of payments based on the variable rate, the other party may receive periodic interest payments based on a fixed rate. The payments are calculated over the notional amount. The first rate is called variable, because it is reset at the beginning of each interest calculation period to the then current reference rate, such the LIBOR published rate. Often, at least one of the legs to a swap has a variable rate which may be based on any agreed upon factors such as a reference rate, the total return of a swap, an economic statistic, etc.

The parties to an IRS transaction generally utilize these exchanges to limit, or manage, exposure to fluctuations in interest rates, or to obtain lower interest rates than would be otherwise obtainable without the exchange. The interest rate utilized within/as a part of an IRS transaction may be linked to a known or agreed upon rate such as, for example, the rate associated with an agreed upon commercial paper, the rate associated with Treasury bills, etc. While it may be difficult to predict the agreed upon rate associated with any IRS transaction or other forward looking contract, large amounts of historical data is available that allows the relationship between interest rates and time to be plotted as a yield curves. The yield curve allows the parties to accurately estimate future interest rates for a period of time, e.g., six months, one year, 3 years, etc.

By way of example, given identical terms and conditions, a party having an excellent credit rating will likely pay less to secure or raise funds than another party having an incrementally lower credit rating. Thus, in the floating for fixed interest rate swap mentioned above, one party could secure funds at a floating rate and the other could secure funds at a fixed rate based on the notional amount of the secured funds or loan. The two parties, in turn, could agree or contract to exchange their two interest rates. The first party can utilize the floating to fixed interest rate swap to fix the net interest expense of their floating rate loans by making fixed rate payments and receiving floating rate payments, from the second party, that can be used to offset the floating interest expense on the notional amount of their loan. Conversely, the second party can utilize the fixed to floating interest rate swap (e.g., the opposite of the first party's transaction), to secure access to a presumably lower floating rate in order to achieve immediate interest savings or a better asset and liability match. It will be understood, that different types of interest rate swap transactions or other over-the-counter financial instruments may be entered into or contracted by the parties without departing from the teachings disclosed and discussed herein.

B. Other Over-The-Counter Products

Another example of a swap is a total return swap (also known as total rate of return swap, or TRORS). A total return swap is a swap in which one party receives interest payments based on an underlying asset (plus any capital gains/losses) over the payment period, while the other receives a specified fixed or floating cash flow. The total return is the capital gain or loss, plus any interest or dividend payments. The specified fixed or floating cash flow is typically unrelated to the credit worthiness of the reference asset. The underlying asset may be any asset, index, or collection of assets. The parties gain exposure to the return of the underlying asset, without having to actually hold the asset. That is, one party gains the economic benefit of owning an asset without having the asset on its balance sheet, while the other (which does retain that asset on its balance sheet) has protection against a potential decline in its value. An equity swap is a variation of a total return swap. The underlying asset in an equity swap may be a stock, a basket of stocks, or a stock index.

Regardless of the type of transaction, over-the-counter financial product or instrument contracted by the parties, the expiration or maturity of the future streams of interest payments may occur well in the future. Thus, each of the parties or counterparties may have a book or portfolio containing multiple transactions, IRS transactions, etc., having a variety of maturity dates. This large and complex book or portfolio of transactions can require the parties to expend substantial resources tracking and managing the contracted products. Moreover, for each of transactions within the portfolio, each of the parties maintains an element of risk that one of its counterparties from a previous transaction will default on a payment.

II. Standardization of Over-The-Counter Products

A. General Overview

Figure 1:
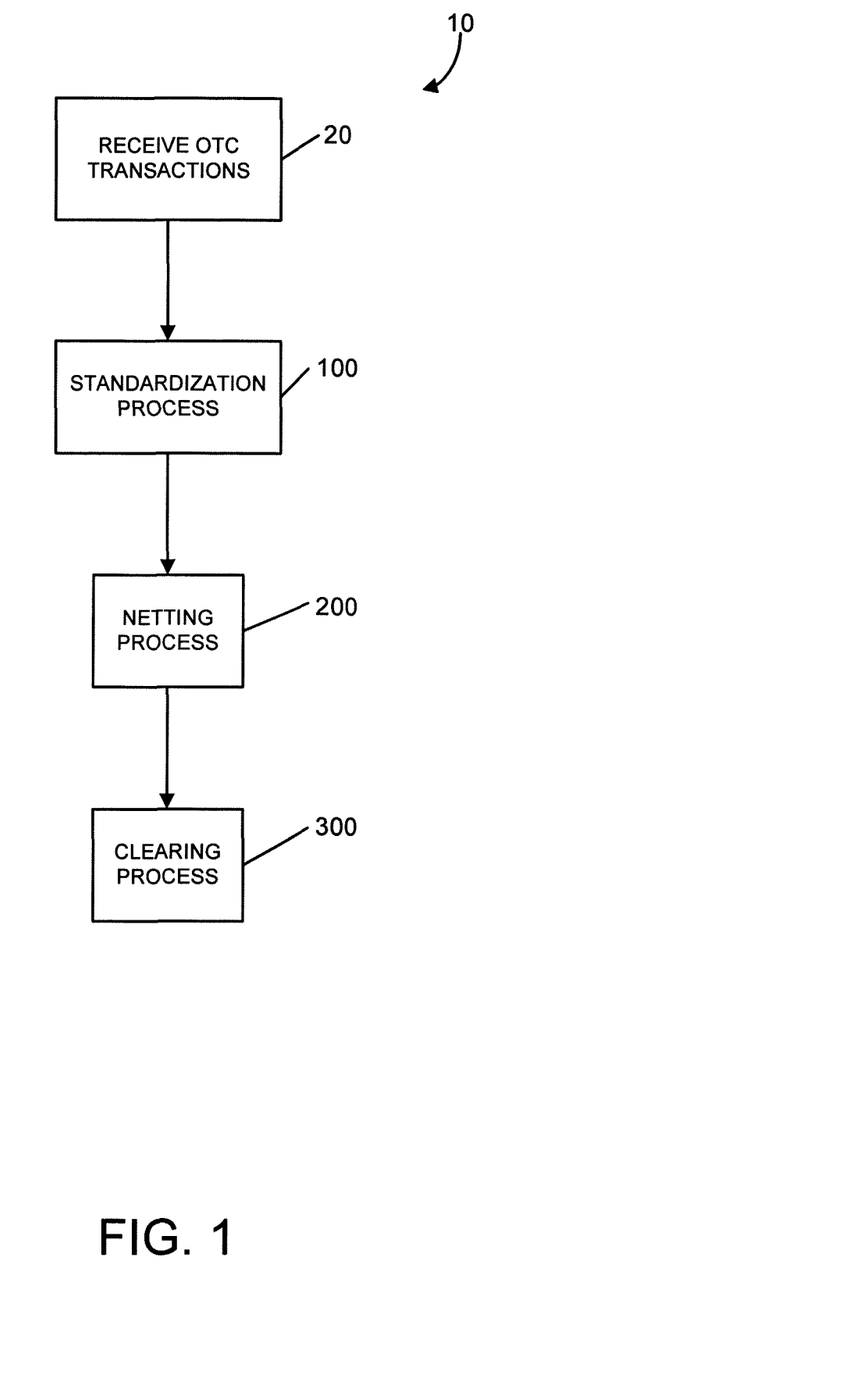
FIG. 1 illustrates one embodiment of a post-trade service and management method implemented in accordance with the teaching disclosed herein.

Exemplary embodiments of methods, apparatuses, systems and financial products that provide for efficient clearing and/or post-trade service of over-the-counter (OTC) financial derivative products and transactions such as, for example, IRS products and transactions are disclosed and discussed below. The post-trade service of OTC financial transactions provides a unified system and means of managing multiple OTC financial transactions and limiting the risks of dealing with other parties to the contract or transaction. FIG. 1 illustrates an exemplary embodiment for method of clearing and post-trade servicing 10 for an exchange traded OTC financial product which includes: (i) a standardization process 100; (ii) a netting process 200; and (iii) a clearing process 300. At block 20, the post-trade service and clearing method 10 provides for receiving data associated with transactions for OTC financial instruments. For example, a trader may place an order related to one or more OTC financial instruments via a web-based or other electronic order interface. The order, in turn, may be match by an electronic matching engine or module with another order having similar terms, transaction parameters, etc. Examples of electronic trading interfaces or front-end trading applications that enable access to the electronic trading platforms are offered by Independent Software Vendors (ISVs), brokerage firms and other application providers. A list of some such platforms is available at http://www.cme.com/trading/get/isvappl.html. An example of an electronic matching engine or module includes the CME Globex® platform, provided by the Chicago Mercantile Exchange (CME) Inc., located at 20. S. Wacker Drive, Chicago, Ill. 60606.

Alternatively, or in addition to, a trader may send a request for quote to one or more potential counterparties. The trader may transmit the request using an electronic messaging broker system or request for quote system. The potential counterparties may respond to the request by supplying proposed terms and transactions parameters. The trader may, in turn, negotiate with the respondent and/or agree or accept the terms of the proposed transaction. The terms, transaction parameters, etc., relate to one or more transactions for interest rate swaps, the positions of the parties, the notional value and the interest rate swaps among other data related to the interest rate swap. A party, in this exemplary embodiment, may enter into over-the-counter transactions with a counterparty at a negotiated interest rate, either a fixed or floating rate. The principal or notional amount of the swap may be utilized to calculate the interest stream which is the subject of the transaction.

Block 100 indicates the standardization process, which may be simply referred to as standardization, and which generally includes converting a negotiated OTC financial product into a standard or predefined contract. In a standardized contract, the terms such as payment calendars, reset calendars, reference assets or entities, indices, contract activation and expiry dates, and other terms (excluding price, interest rate or quantity) are pre-defined and cannot be negotiated during a trade of the contract. The standardized contract or transaction may, for example, be offered by the central clearing counterparty and may be identified by the matching engine or module. Alternatively, the clearing counterparty or a clearing module may receive the match information provided by the matching engine or module and may, in turn, identify the appropriate standardized contract.

Other standardized transactions may be defined by one or more transaction parameters. For example, a standard transaction may include transaction parameters such as, for example, contract duration, fixed interest rates, floating interest rates, payment calendars, start dates, reset frequencies, day-count conventions for fixed and floating rates, etc. The transaction parameters may be further categorized to include (a) negotiable or negotiated parameters such as, for example, notional amounts, interest rates (both fixed and/or floating), which are agreed upon by each party to the transaction, and (b) standardized or pre-defined transactions such as, contract duration, reset frequency, day-count conventions, etc. It will be understood that overlap may exist between the (a) negotiated parameters and the (b) standardized parameters. For example, the OTC product described above may be defined with a first interest rate and first duration, and the corresponding standardized financial product may include a different, but related, second interest rate and second duration. Moreover, these standardized financial products or contacts may be entered-into and/or based upon a standard or agreed-upon day such as the beginning of the month, quarter, etc. The definitions for these standardized financial products are typically established by a neutral third party such as an exchange and the contracts are listed with descriptive symbols to facilitate easy price discovery and trade.

Block 200 indicates the netting process. The netting process generally includes unwinding or closing out the OTC derivative products that had been converted to a standardized IRS transaction and determining a net or net present value position that accounts for all of these standardized contracts. The netting process may include unwinding each of the OTC derivative products and determining a net position that accounts for all or substantially all of the standardized contracts. The netting process may be performed by the clearing counterparty and/or by a netting engine or module configured to determine the net position between each of the OTC products and the corresponding standardized transaction. The individual netted positions determined by the netting engine or module may, in turn, be consolidated based on, for example, the fixing or starting date on which the standardized financial products or contacts were entered.

Block 300 indicates a central clearing of the standardized and netted positions. In an embodiment, a clearing process may be performed by a central counterparty, clearinghouse and/or a clearing module or engine for the standardized and netted IRS transaction. The clearing counterparty or clearing engine may receive the standardized and netted positions of each participant. The clearing counterparty may track each position and may determine profits and losses for each holder of a position to the IRS transaction according to, among other things, notional value, net-present value of IRS transaction, and changes to the interest rate. The profits and losses may be determined periodically, such as a periodic mark-to-market process for determining an open interest or value in an open position.

Figure 2:
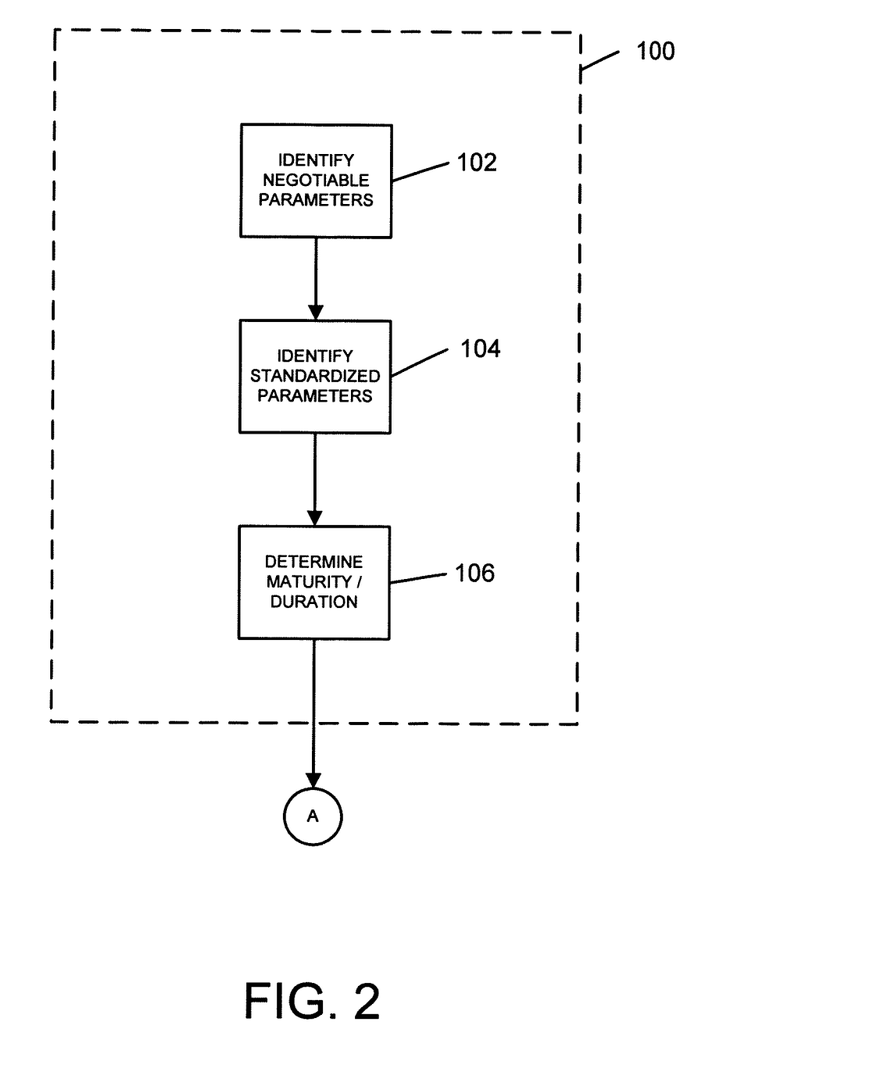
FIG. 2 illustrates one embodiment of a standardization process that may be implemented by the method shown in FIG. 1.

FIG. 2 illustrates an exemplary detailed view of the standardization process 100 shown in FIG. 1. At block 102, the negotiable parameters of the OTC derivative product, such as an IRS transaction, or any other financial instrument to be standardized, are identified and catalogued. For instance, if the financial instrument is an IRS transaction, the negotiable parameters may include, for example, an interest rate and a notional amount.

At a block 104, the standardized parameters associated with the standardized financial instrument are identified and correlated. For example, the standardized parameters or terms of the standardized financial instrument or IRS transaction may include a start date, fixed rate payment calendar, floating rate payment calendar, floating rate reset calendar, reference index and a duration.

At block 106, the predefined or standardized financial instrument having an agreed upon a maturity or duration that corresponds to the duration(s) identified as a standardized or negotiable parameter or term may be selected. The predefined financial instrument such as a standardized IRS transaction represents a financial instrument suitable for trading on an exchange.

Figure 3:
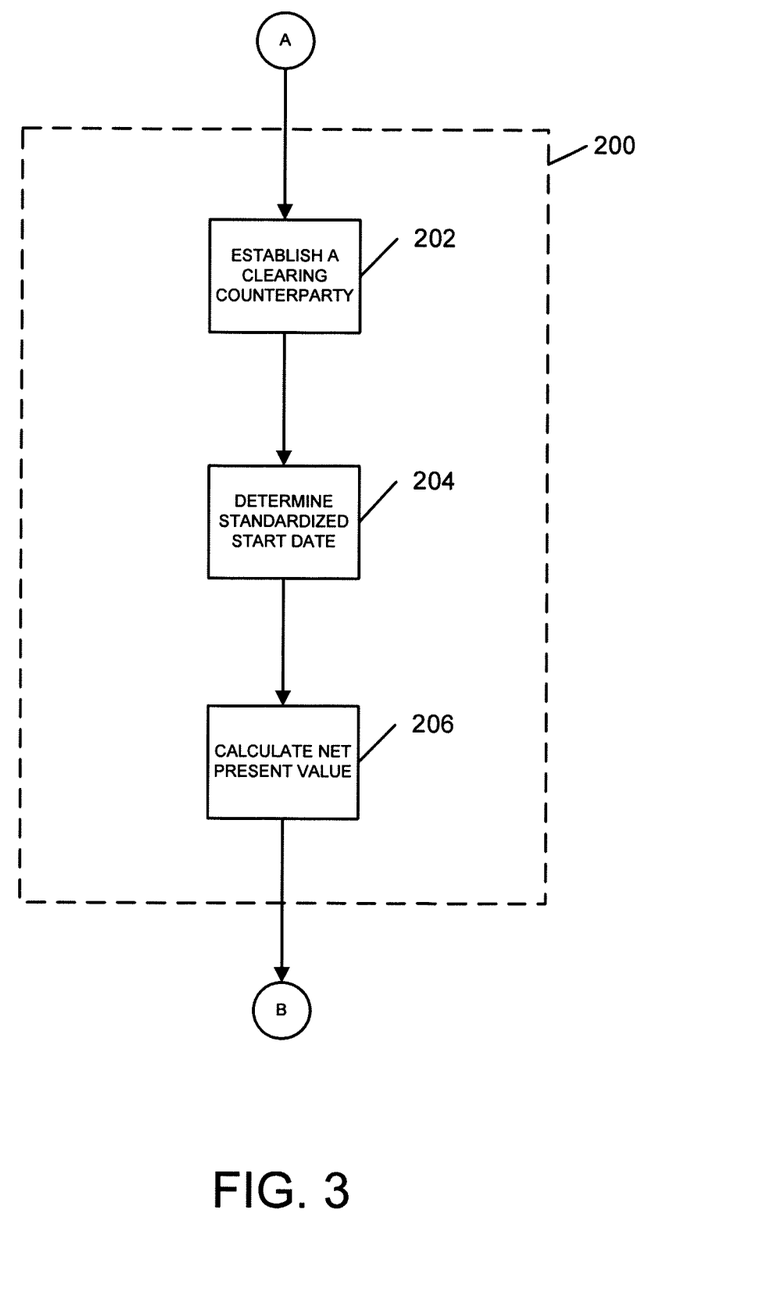
FIG. 3 illustrates one embodiment of a netting process that may be implemented by the method shown in FIG. 1.

FIG. 3 illustrates an exemplary detailed view of the netting process 200 shown in FIG. 1. The netting process 200 includes harmonizing the negotiated OTC derivative product or financial instrument with the standardized financial instrument identified and defined during the standardization process 100. The netting process 200 may identify and account for differences between the financial instrument negotiated between two parties and the standardized or predefined financial instrument.

At block 202, a clearing counterparty party (CCP), such as a clearing house, is identified. The CCP may stand between the two (or more) parties associated with the negotiated OTC financial instrument. The CCP, in one exemplary embodiment, receives orders related to the negotiated OTC product. The CCP standardizes these orders with a predefined financial instrument or standardized OTC derivative product. Alternatively, or in addition to, the CCP may receive orders which simply relate to one or more of the predefined financial instruments or standardized OTC derivative products. The CCP, in turn, may match the orders received from multiple parties based on, for example, a comparison of the negotiated or standardized parameters, industry, credit rating, agreements or status with the CCP, or other criteria.

At block 204, the standardized start or fixing date of the standardized IRS transaction is identified. At this standardized start date, the net present value of the standardized IRS transaction may be calculated as a function of the standardized interest or fixing rate associated with the start date.

At block 206, the difference between the negotiated OTC derivative product and the standardized financial instrument may be calculated by the CCP. For example, in the case of IRS transactions the net present value of the negotiated IRS contract or financial instrument is determined, at least, as a function of the negotiated interest rate, the notional amount and the duration. The difference between the net present values of the two financial instruments can be compared and evaluated to determine a cash flow difference between the standardized IRS transaction and the negotiated IRS transaction.

Figure 4:
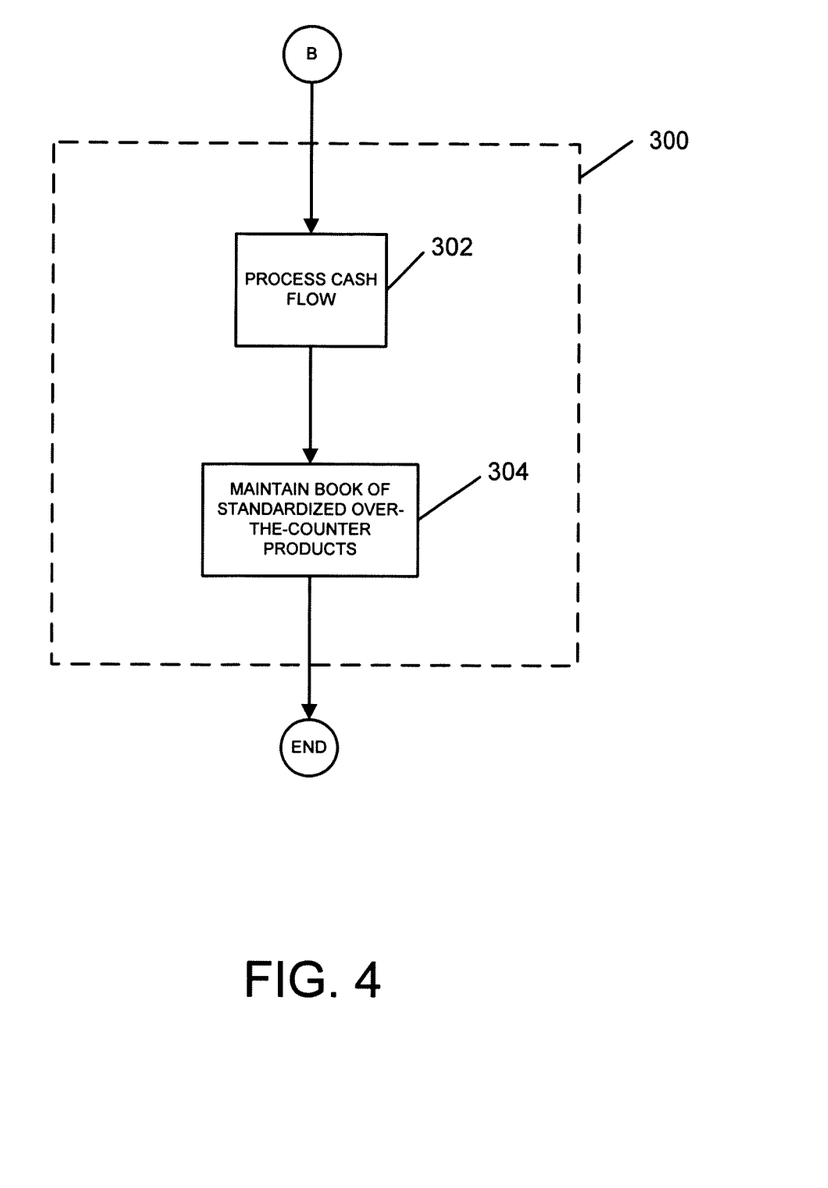
FIG. 4 illustrates one embodiment of a clearing process that may be implemented by the method shown in FIG. 1.

FIG. 4 illustrates a detailed view of the clearing process 300 shown in FIG. 1. At block 302, the cash flow difference between the net present values of the two financial instruments can be settled by the CCP. For example, the CCP will pay and/or receive the calculated difference between the net present values of the two instruments. In this way, the CCP can ensure completion or satisfaction of any contract involving one or more parties and/or financial instruments.

At block 304, once the cash flows or net present value differences are processed by the clearing process 300, the standardized financial instruments such as the standardized IRS transaction may be maintained and monitored by the CCP throughout the duration of the transaction.

B. Illustrative Examples

1. Standardization Process

Figure 5:
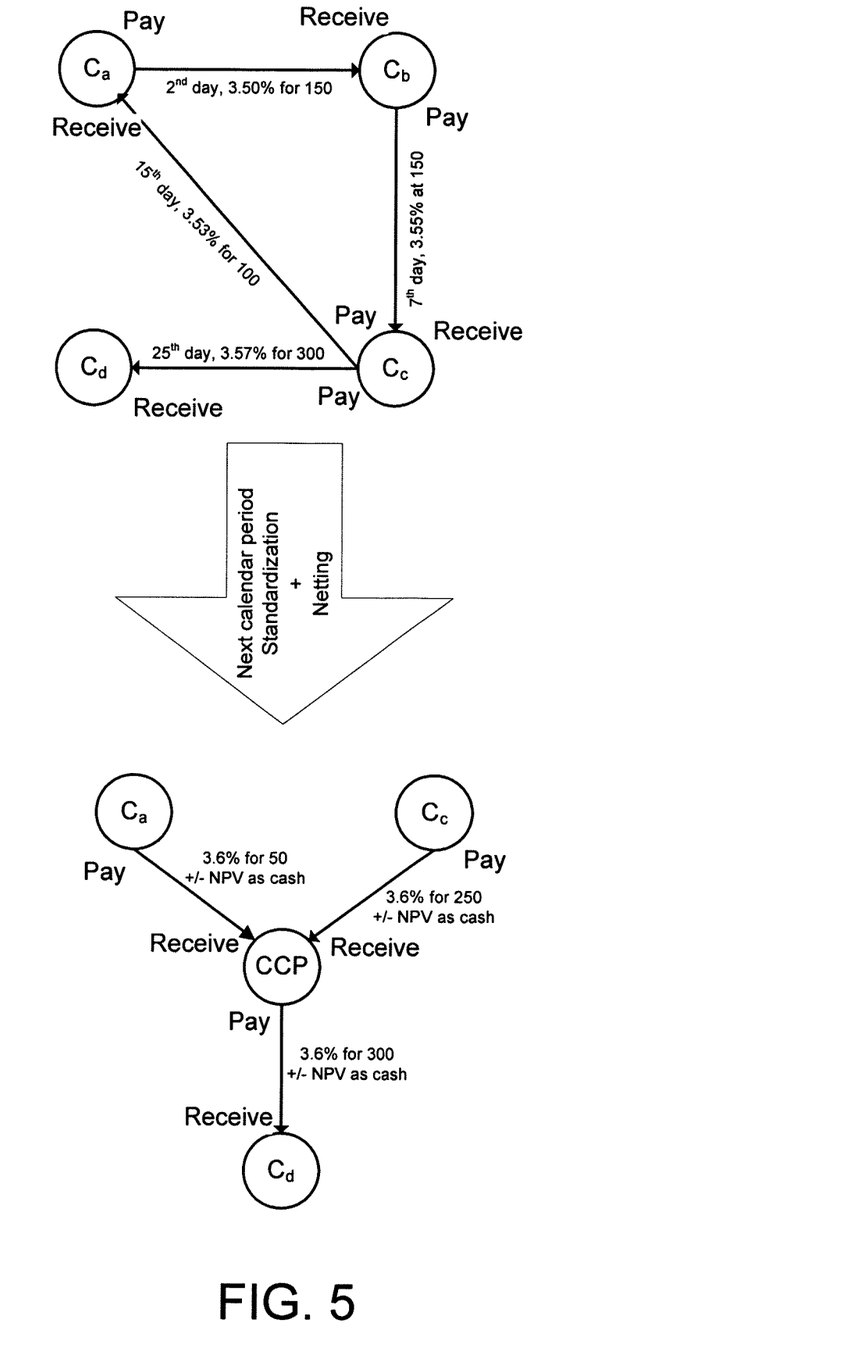
FIG. 5 illustrates another embodiment of the clearing and post-trade service method disclosed herein.

FIG. 5 illustrates an example of the standardization process 100 and the netting process 200 for the disclosed method of post-trade service and management 10. In the example, four parties, $C_a$, $C_b$, $C_c$ and $C_d$, have entered into agreements for an OTC derivative product which may be an IRS having the same maturity. That is, the four parties, $C_a$, $C_b$, $C_c$ and $C_d$, in turn, contract and enter into individual IRS transactions with one or more of the other parties. For the sake of simplicity, the length, duration or maturity of all of these contracts is assumed to be ten (10) years. Each of the IRS transactions in the present example is entered into by the parties during a trading period, and is to be standardized to begin on the first day of the next calendar period. The trading period may be any trading period, including a day, week, month, bimonthly, quarter, semi-annual or year. In the example of FIG. 5, the trading period is a month (i.e., the month of August) and the next calendar period is the following month (i.e., September).

On August $2^{nd}$, $C_a$ agrees to pay the fixed rate interest stream at 3.50% on €150 million to $C_b$. The payment may be tendered in any agreed upon currency or arrangement, which in the example of FIG. 5 is in Euros (€). On August $7^{th}$, $C_b$ agrees to pay the fixed rate interest stream at 3.55% on €150 million to $C_c$; on Aug. $15^{th}$, $C_c$ agrees to pay the fixed rate interest stream at 3.53% on €100 million to $C_a$ and on August $25^{th}$, $C_c$ agrees to pay the fixed rate interest stream at 3.57% on €300 million to $C_d$. These dates, amounts and interest rates are utilized solely as an example and are not intended to limit the scope of this example or disclosure in any manner. Moreover, while the contracts in this example are to be standardized to the beginning of a month (September $1^{st}$ in this example), other starting points could have been defined such as, for example, the beginning of a week, a bi-monthly period, once a quarter, a semi-annual period, or any other desired time interval.

The four transactions between $C_a$, $C_b$, $C_c$ and $C_d$ are, in turn, unwound and standardized into three transactions between the individual parties and the clearing counterparty (CCP). The CCP may be, for example, the Chicago Mercantile Exchange (CME), Inc. located at 20 South Wacker Drive, Chicago, Ill. 60606. The CCP stands between each of the parties and assumes the financial obligations of each side of the standardized transaction with respect to the other side in order to ensure performance. For example, if the daily fixing interest rate e.g., the LIBOR rate, on the first day of September (September $1^{st}$) is assumed to be 3.6%, then the various transactions or contracts between the parties can be standardized based on the daily fixing rate at the beginning of the next calendar or fixing date. The positions of each of parties $C_a$, $C_b$, $C_c$ and $C_d$ may be standardized at the fixing rate for the net of the notional values of the swaps that are being standardized. In the example set forth above, the standardization process can be described as: $C_a$ agrees to pay CCP an amount equal to the fixed interest stream at 3.6% on €50 million (the difference between the notional amount of €150 million to $C_b$ and the notional amount of €100 million received from $C_c$); $C_c$ agrees to pay CCP an amount equal to the fixed rate interest stream at 3.6% on €250 million (the difference between the notional amount of €400 million-€100 million paid to $C_b$ and €300 million paid to $C_d$, and the notional amount of €150 million received from $C_b$); CCP pays $C_d$ an amount equal to the interest stream at 3.6% on €300 million (the amount received from $C_c$).

To standardize the contracts, the transactions for the OTC derivatives are unwound. Table 1 below illustrates the position of a central counterparty to the position of each party $C_a$, $C_b$, $C_c$ and $C_d$ to unwind the transactions during the trading period.

TABLE 1

| | $C_a$, | $C_b$ | $C_c$ | $C_d$ |
|---|---|---|---|---|
| | Receive NPV (3.5%, 150) | Pay NPV (3.5%, 150) | Pay NPV (3.55%, 150) | Pay NPV (3.57%, 300) |
| Transactions that unwind original OTC positions | Pay NPV (3.53%, 100) | Receive NPV (3.55%, 150) | Receive NPV (3.53%, 100) | |
| | | | | Receive NPV (3.57%, 300) |

TABLE 1-continued

|  | $C_a$, | $C_b$ | $C_c$ | $C_d$ |
|---|---|---|---|---|
| Standard IRS positions that replace OTC positions | Pay NPV (3.6%, 50) |  | Pay NPV (3.6%, 250) | Receive NPV (3.6%, 300) |
| Net NPV | −ve <<CCP pays>> | +ve <<$C_b$ pays>> | −ve <<CCP pays>> | +ve <<$C_d$ pays>> |

2. Netting Process

Transactions for OTC derivative products often occur at different times, with different parameters, such as notional amounts and interest rates. As shown in FIG. 5, each of these transactions occurred on a different day in the trading period (i.e., August) ranging from the $2^{nd}$ to the $25^{th}$. The interest rates in the example of FIG. 5 range from 3.50% to 3.57%, but the interests may be within any range. To completely standardize and net the positions on the contracts, the differences in the individual times/durations and interest rates are accounted for and reconciled. To reconcile the transactions, the net present value (post initiation of swap) of each of the original transactions and the standardized transactions are calculated. For example, the net present value (NPV) of each original swap (post-initiation) may be calculated for each transaction using the formula:

$$NPV = \sum_{i=1}^{n}(c_i \times df_i) - \sum_{i=1}^{n}(\theta_i \times df_i)$$

Where: n is the number of coupon payments; $c_i$ is the fixed cash flow calculated using the fixed coupon, actual number of days between coupon dates and the notional amount; $\theta_i$ is the floating cash flow calculated using the anticipated floating rates, actual number of days between coupon dates and the notional amount; and $df_i$ is the discount factor for each of the payment dates.

In another embodiment, the NPV may be calculated using the formula:

$$NPV = \sum_{i=1}^{n}\left(R \times \frac{d_i - d_{i-1}}{360} \times sf_i\right) - (sf_0 - sf_n)$$

and we have for the par rate $\tau$ $$\sum_{i=1}^{n}\left(\tau \times \frac{d_i - d_{i-1}}{360} \times sf_i\right) = sf_0 - sf_n \Rightarrow NPV = (R - \tau) \times \sum_{i=1}^{n}\left(\frac{d_i - d_{i-1}}{360} \times sf_i\right)$$

Swap Value Factor:

$$SVF_n = \sum_{i=1}^{n}\left(\frac{d_i - d_{i-1}}{360} \times sf_i\right) \boxed{NPV = (R - \tau) \times SVF_n}$$

where:
$\tau \rightarrow$ Par rate of the swap with n fixed coupons
$\psi^f \rightarrow$ Par rate of the swap with n−1 fixed coupons with a forward start-date of 'f' month
$R \rightarrow$ Traded rate of the swap with n fixed coupons
$d_0 \rightarrow$ Spot Date=IMM date, $d_i$. Coupon payment date, $t_0 \rightarrow$ Today's date
$r_0 \rightarrow$ Current floating rate, $r_i \rightarrow$ floating rate on d,
$df_i \rightarrow$ Discount factor on d, at IMMdate ($df_0$=1)
$sf_i \rightarrow$ Discount factor on d, at Today's date
$\psi_{OIS}^{IMM} \rightarrow$ Par rate for the cleared swap OIS to IMM date after roll The NPV and Swap Value Factor may be determined and used according to the systems, methods, and processes described in co-pending U.S. patent application Ser. No. 11/950,117, entitled Factorization of Interest Rate Swap Variation, filed on Dec. 4, 2007, the disclosure of which is incorporated herein in its entirety.

In another embodiment, the NPV may be used for daily margin and daily roll for an overnight index swap (OIS). An OIS may be indexed to a known overnight rate, such as the Effective overnight EONIA rates or Overnight Federal Funds Rate and end on monthly IMM dates out to 12 months. The NPV may be calculated using the formula:

$$NPV = (R_{OIS} - \tau_{OIS}) \times \frac{\frac{D_{IMM} - t_{-1}}{360}}{\frac{\left(1 + \tau_{OIS} \times \frac{D_{IMM} - t_{-1}}{360}\right)}{SVF_{OIS}}}$$

Floating coupon resets daily and rolls daily in a swap forward 1 day forward:

$$\left(1 + \theta_{-1} \times \frac{t_0 - t_{-1}}{360}\right) \times \left(1 + \psi_{OIS} \times \frac{D_{IMM} - t_0}{360}\right) = \left(1 + \tau_{OIS} \times \frac{D_{IMM} - t_{-1}}{360}\right)$$

$$\psi_{OIS} = \left(\frac{1 + \tau_{OIS} \times \frac{D_{IMM} - t_{-1}}{360}}{1 + \theta_{-1} \times \frac{t_0 - t_{-1}}{360}} - 1\right) \times \frac{360}{D_{IMM} - t_0}$$

Where:

$\tau_{OIS} \rightarrow$ Par OIS swap rate at $t_0$ maturity $D_{IMM}$
$R_{OIS} \rightarrow$ Traded OIS swap rate at $t_0$ maturity $D_{IMM}$
$D_{IMM} \rightarrow$ IMM maturity date
$t_0 \rightarrow$ Today's date
$\theta_{-1} \rightarrow$ Overnight rate for $t_{-1}$
$\psi_{OIS} \rightarrow$ Swap OIS rate for the rolled OIS Swap for $d_0$ In calculating the NPV for each of these transactions, the monetary variations attributable to, for example, the differences in starting dates, the difference between the negotiated interest rate and the standardized or fixing rate and/or the maturity may be accounted for and quantified.

Table 2 illustrates the notional amounts, independent of the interest rates, of each of the original IRS transactions in tabular form.

TABLE 2

| Date | $C_a$ P/R | $C_a$ Notional | $C_b$ P/R | $C_b$ Notional | $C_c$ P/R | $C_c$ Notional | $C_d$ P/R | $C_d$ Notional |
|---|---|---|---|---|---|---|---|---|
| $2^{nd}$ | P | 150 | R | 150 | | | | |
| $7^{th}$ | | | P | (150) | R | 150 | | |
| $15^{th}$ | R | (100) | | | P | 100 | | |
| $25^{th}$ | | | | | P | 300 | R | 300 |
| Sep. 1 | | 50 | | — | | 250 | | (300) |

For example, Table 2 shows that party $C_a$ entered into an IRS transaction(s) to pay €150 million on the $2^{nd}$ and received €100 million on the $15^{th}$. When then contracts are standardized on September $1^{st}$, these notional amounts net out to equal €50 million. Utilizing these principles: the nominal amount for $C_b$ is zero; the notional amount for $C_c$ is €250 million and the notional amount for $C_d$ is €300.

The NPV amounts associated with each of the original negotiated IRS transactions, or contracts, and the new standardized IRS transaction in tabular form may be determined. As shown in Table 1 above, each of the August IRS transactions may be unwound and normalized to the IRS transaction and standardization date. For example, party $C_a$ has two net present values NPV1 and NPV2 associated with the transactions conducted in the example month of August. NPV1 might represent the present value of the amount paid on an IRS transaction entered into on the August $2^{nd}$, e.g., 29 days from August $2^{nd}$ to September $1^{st}$ when the standardized contract is enacted, at fixed interest rate of 3.50% on €150 million. NPV2 might represent the present value of the amount received on an IRS transaction entered into on the August $15^{th}$, e.g., 16 days from August $15^{th}$ to September $1^{st}$ when the standardized contract is enacted, at an interest rate of 3.53% on €100 million. The net present value cash flows NPV1 and NPV2 can then be netted with the standardized IRS transaction entered into by the $C_a$ with CCP which, in this example, is standing in for $C_b$ and $C_c$.

In this example, the NPV(s) associated with the August IRS transactions between $C_a$, $C_b$, $C_c$ and $C_d$ are given the opposite signs, for example, pay becomes receive and vice versa, to represent a cash flow from the perspective of the CCP to unwind of the non-standardized IRS transactions. Thus, as discussed above, a negative net NPV indicates a cash flow from the CCP to the party and a positive net NPV indicates a cash flow from the party to the CCP. In this way, the cash flows to and from the CCP are balanced upon standardization regardless of when in the given period the contract was initiated or at what interest rate was initially agreed upon. Thus, in the example provided above, the netted cash flows and transactions for party $C_a$ results in a negative cash flow, e.g., a cash flow from the CCP to $C_a$.

3. Clearing Process

A clearing process 300 may be initiated to process or direct the cash flows. For example the cash flows generated during the standardization process 100 and netting process 200 may be cleared.

Following the initial cash flow processing, the clearing process 300 maintains the standardized IRS transactions, now-guaranteed by the CCP, for its lifespan (e.g., 10 years) as shown in the embodiment from FIG. 1. The number of standardized IRS trades in this exemplary method is significantly smaller. The number of standardized contracts may be pre-defined according to the standardization periods. In an embodiment, the standardization period is monthly. That is, every month, the transactions are standardized and netted. In an example including thirty (30) maturities, the result would be three-hundred sixty (360) standard OTC contracts (thirty (30) maturities by twelve (12) monthly standardizations for each). The maximum number of positions that a holder may have would be limited to or capped at three-hundred sixty (360) positions per currency. As will be understood, this efficiency comes from standardizing and netting each of the individual IRS transactions entered into in a period into a single standard contact beginning on an agreed upon date.

4. Floating Rate Reset and Payment Processing

As the OTC derivatives products, transactions, contracts, positions and orders for all parties are standardized; the floating rate reset and payment processing may be managed because there is a single floating rate reset and cash flow calendar per currency. The International Swaps and Derivatives Association (ISDA) day-count conventions, affect of holidays and other cash flow and reset related parameters may also be pre-selected.

5. Margining and Mark-To-Market

Figure 6:
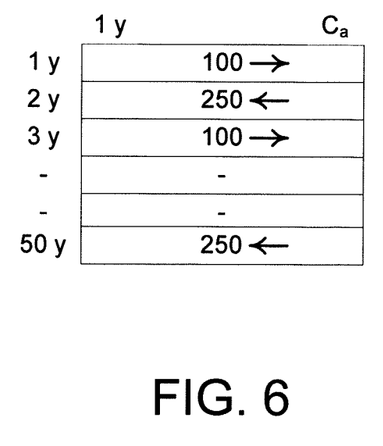
FIG. 6 illustrates an example of netting notional amounts for an interest rate swap.

FIG. 6 illustrates the portfolio, e.g., standardized IRS positions and orders held by the CCP such as, for example, CME, of party $C_a$ across multiple periods or maturities. The arrow "→" indicates that the CCP is the payer, while the arrow "←" indicates that the CCP is the receiver of the fixed rate cash flows related to the OTC derivatives transaction. Standardization of each of these interest rate swaps allows the CCP to net or aggregate the net present values of each IRS for a given year with all of the other net present values for the given. Thus, FIG. 6 shows that the netted net present values for the party $C_a$ across multiple maturities.

The mark-to-market or assignation of value can be done using a specific yield curve known as a Zero Coupon Yield Curve (ZCYC) to ensure that the margin or collateral requirements for each party, $C_a$, etc., are satisfied. The ZCYC, as with other yield curves, can be built using industry sources, historical data, etc., or by relying on a set of liquid maturities and ISDA Swap Fixing rates.

6. Post-Clearing Rolling of Positions

Figure 7:
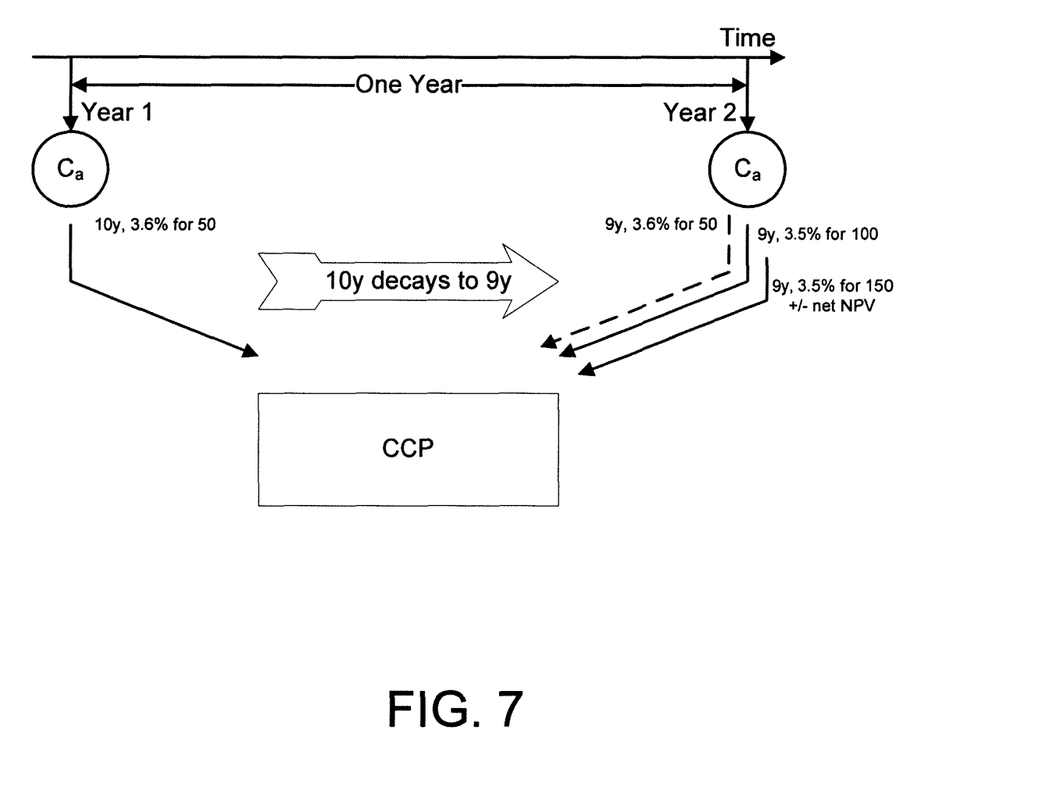
FIG. 7 illustrates an example of a rolling process that can be performed periodically throughout the duration of the financial transaction.

The post-trade servicing may minimize a number or volume of outstanding or active IRS transaction, orders or contracts for a portfolio with the passage of time. FIG. 7 illustrates an example of a possible rolling opportunity available for party $C_a$. For example, on September 1, year one, $C_a$ has a net position on a ten (10) year maturity IRS at, 3.6% for €50 MM. On September 1, year 2, the position will age or decay one year to a nine (9) year maturity IRS. In the example, the decayed nine (9) year maturity is at 3.6% for €50 MM. If $C_a$ has a new position for a nine (9) year maturity for September of year 2 at 3.5% for €100 MM, the two nine (9) year maturity positions may be rolled together. That is, the CCP now may roll the pay nine (9) year 3.6% for €50 MM into pay nine (9) year, 3.5% for €100 MM to generate pay a new standardized and netted position for $C_a$ at nine (9) year, 3.5% for €150 MM and a net NPV cash flow. The rolling affect is similar to the netting affect described in connection with the standardization process 100 and the netting process 200 including the calculations of the total NPV to determine the cash flow affect of the roll.

With a manageable size of the IRS portfolio for the counterparties, the CCP has opportunities to provide other services such as assignments, e.g., one counterparty to the CCP may choose to assign its positions with the CCP to a different counterparty, and substitutions into futures, e.g., one counterparty to the CCP can choose to replace the IRS position with a strip of futures that simulate the cash flow affect of the IRS.

Until the standardization process 100 triggers on the pre-defined start date such as, for example, the beginning of a month, quarter, etc., there may be counterparty risk associated with the negotiated IRS transactions. Thus, the exemplary method 10 minimizes the roles of users for risk adverse parties while affording other parties operational efficiencies by collapsing their positions into fixed number of positions managed via the CCP. Moreover, because the standardization process 100 and the netting process 200 are performed regularly or on predefined periodic basis, users may leverage their credit processes for financing the pending OTC products until the standardization process 100 is activated. Furthermore the CCP can select the banks and institutions that can leverage their existing or new clearing relationships to implement the concepts explained. As the method 10 expands, the CCP may increase the frequency in which the standardization process 100 and the netting process 200 are utilized (monthly versus quarterly) or may increase the target user group capable of leveraging this service.

Figure 8:
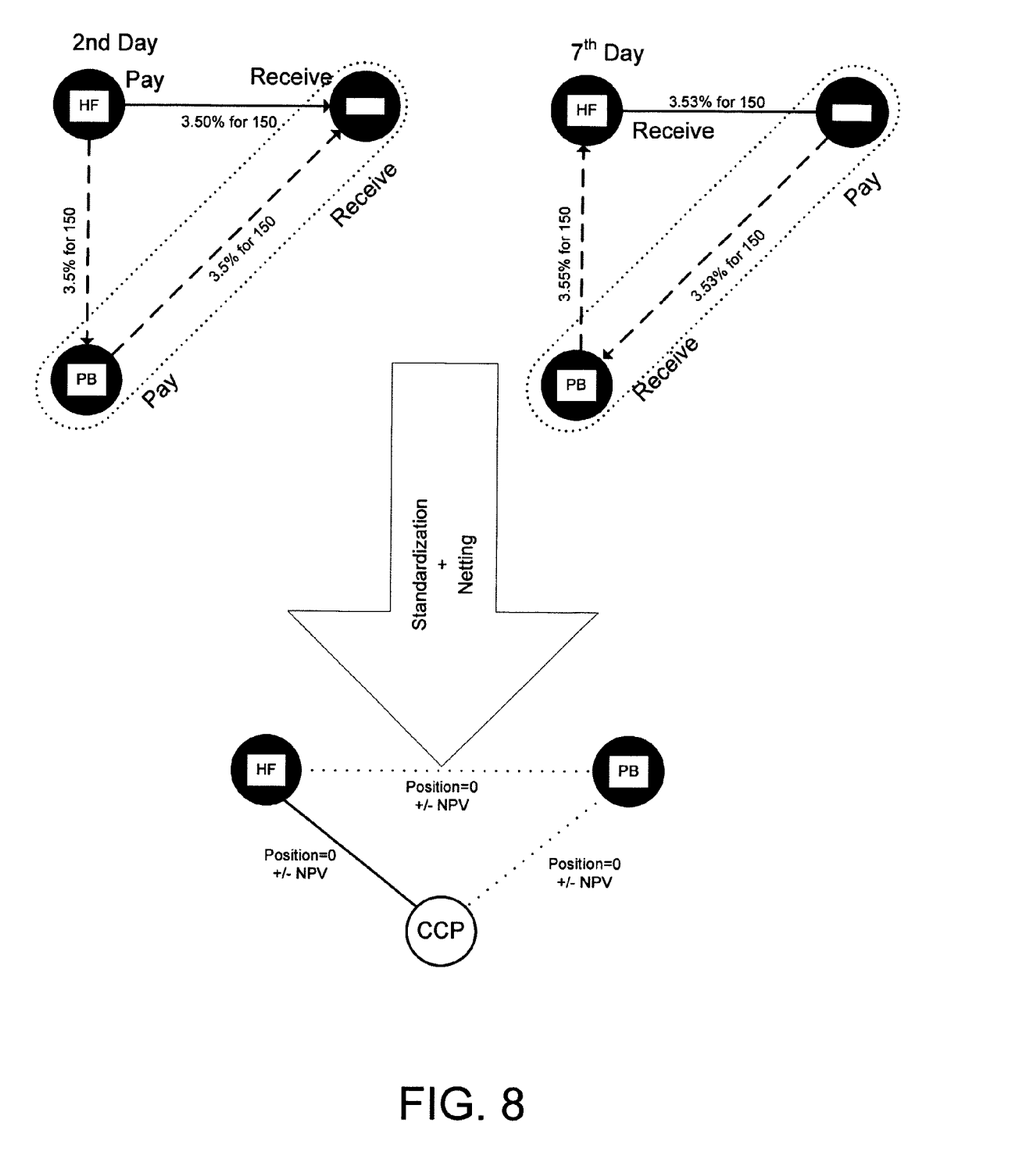
FIG. 8 illustrates an example of the clearing and post-trade service utilized method utilized in connection with an exemplary hedge fund.

FIG. 8 illustrates an example that includes two transactions for an exemplary hedge fund HF in a trading period (e.g., August) and the result of the standardization process 100 and the netting process 200 on the next calendar period (e.g., September 1). The method 10 allows the various positions and interest rates negotiated by the hedge fund HF and the parties PA, PB to be standardized and consolidated via the standardization process 100 and the netting process 200 discussed above. For example, during the standardization process 100 and the netting process 200 the cash flows associated with PA will be netted out and consolidated by the CCP. The remaining cash flows between the hedge fund HF and the party PB which include the difference between the 3.50% interest stream on €150 MM and the 3.53% interest stream on €150 MM are netted out to a neutral position with a resulting cash flow from the netting process. The benefits and cash flow may, in turn, be passed on to the clients, etc. of the party PB.

The steps, elements and processes discussed herein may be encoded as program logic, computer readable code and/or instructions. These encoded elements, in turn, may be stored or embedded on a computer readable medium such as, for example, a hard disk drive, a solid state drive or other storage medium. The computer readable medium may be in communication with a processor which, in response to an appropriate input or command, may execute the program logic stored on the computer readable medium. The execution of this program logic may result in the execution of the step, elements and processes embodied and discussed herein.

III. Management of Standardized Over-The-Counter Products

In yet another embodiment, the financial products may be pre-defined by, for example, by the CCP. These predefined financial products may be utilized in place of negotiated or otherwise customized over-the-counter financial products. In other words, these predefined financial products may be utilized without the need for the standardization process 100 and netting process 200 described above. Thus, instead of requiring parties that wish to enter into, for example, an interest rate swap or other financial arrangement to negotiate the specific terms of a contract, the parties simply may agree to exchange the pre-defined contract with each other, such as through an electronic interface configured to permit traders to present and negotiate trades for the centrally cleared interest rate swap, for example the Swapstream sPro and/or sDealer platforms provided by Swapstream Ltd. of London England. The executed trade hey may be cleared through the CCP.

Pre-defined and standardized financial products, such as centrally cleared interest rate swaps, may be created and/or defined to address and/or satisfy the market requirements of the parties to a typical transaction or contract. The centrally cleared interest rate swaps may be forward-dated interest rate swaps denominated in U.S. dollars versus 3-Month Libor, with maturities from 3 months to 30 years and/or denominated in Euros versus 6-Month Euribor, with maturities from 6 months to 30 years. The centrally cleared interest rate swap may also or alternatively be a Short-term overnight indexed swap ("OIS") ending on monthly International Monetary Market (IMM) start dates. With the centrally cleared interest rate swaps, fixed coupons are periodically reset, such as at the end of every day, and positions are periodically marked to market, such as at least daily. A position may be marked to market daily by resetting the fixed coupon.

In an example, the pre-defined and standardized interest rate swaps may be based on a bi-annual (six month) start and rollover date, having a notional amount determined in one-hundred thousand dollar (USD 100,000) increments. Alternatively, start and rollover dates may be defined as any desirable date or period. For example, the start date may be defined as the first day of any given month while the rollover date could be the beginning of each calendar quarter.

Table 3 illustrates one exemplary pre-defined and standardized centrally cleared interest rate swap having a ten (10) year maturity. In this example, the centrally cleared interest rate swap has fixed and floating legs. By predefining and standardizing these financial products, the parties simply agree on notional amounts and rates, as opposed to negotiating all of the details associated with an OTC IRS, and select an appropriate financial product that may be cleared through the CCP.

TABLE 3

| Name | Description | |
| --- | --- | --- |
| Start-date | Nearest six (6) month coupon anniversary | |
| Maturity | Ten years (10 y) from the IMM start date | |
| Currency | USD | |
| Minimum tradable increments | One-Hundred Thousand USD ($100,000) | |
| Valuation date | IMM start-date - 2 business days (second business day prior to the third Wed of the month) | |
| | Floating leg | Fixed leg |
| Index | USD-LIBOR-BBA | |
| Basis | ACT/360 | ACT/360 |
| Payment frequency | 3 months | 3 months |
| Roll convention | IMM | IMM |
| Holiday centers | US-NY | US-NY |

Figure 9:
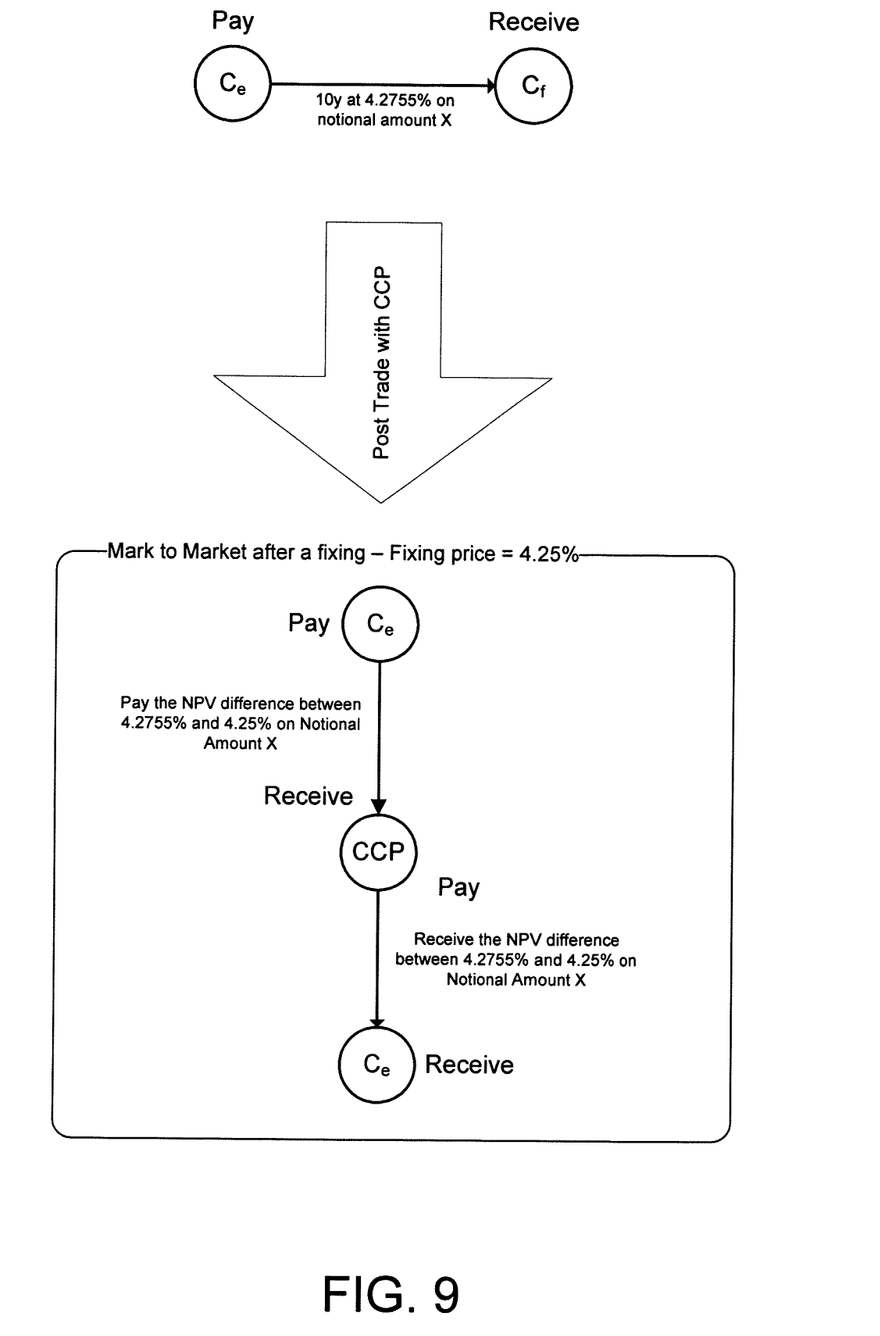
FIG. 9 illustrates an example of another clearing and post-trade service utilizing pre-defined and standardized financial products.

FIG. 9 illustrates an example of a trading scenario between parties $C_e$ and $C_f$. In particular, the parties $C_e$ and $C_f$ enter into an IRS transaction utilizing, for example, the pre-defined financial products discussed above and illustrated in Table 3. In the present example, the parties $C_e$ and $C_f$ agree to enter into a ten year (10 y) IRS transaction at a rate of 4.2755% on an agreed-upon notional amount. The parties $C_e$ and $C_f$, in turn, post a trade with the CCP based on the agreed IRS transaction. The parties $C_e$ and $C_f$ receive confirmation of their trade which indicates that a pre-defined, standardized financial product has been identified and exchanged between $C_e$ and $C_f$ for an agreed notional amount and rate (price). At a pre-determined time the CCP would conduct or select a fixing for the standardized contract. Fixing is the process of selecting the fixing price, which is the rate at which the standardized contract has a Net Present Value (NPV) of zero and is also known as the market rate. Immediately following the fixing, the CCP marks the traded positions of $C_e$ and $C_f$ to the fixing rate. If we use the 4.25% rate as the fixing price of the swap in our example, the marking process results in the CCP receiving the NPV difference between 4.2755% and 4.25% on the notional amount from party $C_e$. Similarly, the CCP pays the NPV difference between 4.2755% and 4.25% on the notional amount to party $C_f$. The variation between the fixing price and the traded price on the positions of each party $C_e$ and $C_f$ may be calculated and updated daily, weekly, or any other agreed upon period. Thus, if the rate has changed at the close of the next period to 4.26%, the NPV difference between 4.25% and 4.26% can be calculated by the CCP for each party $C_e$ and $C_f$. The CCP, in turn, pays and receives the NPV difference for each of the parties $C_e$ and $C_f$ for the new period.

By utilizing the pre-defined and standardized financial products described above, the parties to a transaction are relieved of having to negotiate non-financial details of the transaction. Rather, the parties may focus on the financial decisions related to the transaction, for example, the agreed upon rate, the term, the notional amount and the type of transaction. Moreover the common start and rollover dates for the pre-defined financial products provide for simplified portfolio management by allowing two or more financial products with common maturities and/or durations to be grouped together to define a new pre-defined financial product.

For example, after six months the 10 y swap discussed above matures or ages such that its tenure equals a nine-and-a-half year (9.5 y) swap, the original 10 y swap can be rolled or combined with other 9.5 y swaps in a trader's portfolio, if any. This consolidation may be utilized by the parties to simplify their individual portfolios. This consolidation allows for a reduction of the open positions carried by each of the parties $C_e$ and $C_f$ which, in turn, reduces the management activity required for each portfolio.

The rate on the new rolled position, may be determined according to the formulas (1) and (2):

$$\tau \text{ par rate: } \sum_{i=1}^{n}\left(\tau \times \frac{d_i - d_{i-1}}{360} \times sf_i\right) = \tag{1}$$

$$\sum_{i=1}^{n}\left(r_{i-1} \times \frac{d_i - d_{i-1}}{360} \times sf_i\right) \Rightarrow \sum_{i=2}^{n}\left(r_{i-1} \times \frac{d_i - d_{i-1}}{360} \times sf_i\right) =$$

$$\sum_{i=1}^{n}\left(\tau \times \frac{d_i - d_{i-1}}{360} \times sf_i\right) - \left(r_0 \times \frac{d_1 - d_0}{360} \times sf_1\right)$$

$$\psi^f \text{ forward par rate: } \sum_{i=2}^{n}\left(\psi^f \times \frac{d_i - d_{i-1}}{360} \times sf_i\right) = \tag{2}$$

$$\sum_{i=2}^{n}\left(r_{i-1} \times \frac{d_i - d_{i-1}}{360} \times sf_i\right)$$

(1) & (2): $\sum_{i=2}^{n}\left(\psi^f \times \frac{d_i - d_{i-1}}{360} \times sf_i\right) =$ $$\sum_{i=1}^{n}\left(\tau \times \frac{d_i - d_{i-1}}{360} \times sf_i\right) - \left(r_0 \times \frac{d_1 - d_0}{360} \times sf_1\right)$$

$$\boxed{\psi^f = \frac{\tau \times \sum_{i=1}^{n}\left(\frac{d_i - d_{i-1}}{360} \times sf_i\right) - \left(r_0 \times \frac{d_1 - d_0}{360} \times sf_1\right)}{\sum_{i=2}^{n}\left(\frac{d_i - d_{i-1}}{360} \times sf_i\right)}}$$

Where:
$\tau \rightarrow$ Par rate of the swap with n fixed coupons
$\psi^f \rightarrow$ Par rate of the swap with n−1 fixed coupons with a forward start-date of 'f' month
$R \rightarrow$ Traded rate of the swap with n fixed coupons
$d_0 \rightarrow$ Spot Date=IMM date, $d_i$. Coupon payment date, $t_0 \rightarrow$ Today's date
$r_0 \rightarrow$ Current floating rate, $r_i \rightarrow$ floating rate on $d_i$
$df_i \rightarrow$ Discount factor on $d_i$ at IMMdate ($df_0$=1)
$sf_i \rightarrow$ Discount factor on $d_i$ at Today's date
$\psi_{OIS}^{IMM} \rightarrow$ Par rate for the cleared swap OIS to IMM date after roll By applying these formulae to, for example, the IRS transaction illustrated in Table 3 as it is rolled from a 10 y term to a 9.5 y term, the rate associated with the new position may be calculated as:

$$\psi_{9.5y}^{6m} = \frac{\tau_{10y} \times \sum_{i=1}^{20}[(d_i - d_{i-1})/360 \times sf_i] - [r_{0.5y} \times (d_1 - d_0)/360 \times sf_1]}{\sum_{i=2}^{20}[(d_i - d_{i-1})360 \times sf_i]}$$

In this way, the pre-defined, standardized financial products can be entered and managed by parties. Thus, with standardized roll dates, a trader may minimize the number of interest rate swaps in his portfolio to a finite number of interest rate positions.

It should be understood that various changes and modifications to the presently preferred embodiments described herein will be apparent to those skilled in the art. Such changes and modifications can be made without departing from the teachings of the present invention and without diminishing its intended advantages. It is therefore intended that such changes and modifications be covered by the appended claims.

What is claimed is:

1. A method of managing financial products, the method comprising:
   receiving, using at least one processor, transaction parameters associated with an open financial position, wherein the open financial position is a negotiated interest rate swap between counterparties;
   identifying, using the at least one processor, a standardized financial product, where the standardized financial product reflects the transaction parameters associated with the negotiated interest rate swap; and
   converting, using the at least one processor, the negotiated interest rate swap associated with the received transaction parameters to the identified standardized financial product; wherein converting further comprises:

determining, using the at least one processor, a net present value position between the negotiated interest rate swap and the identified standardized financial product; and clearing, using the at least one processor, the net present value position between the negotiated interest rate swap and the identified standardized financial product.

2. The method of claim 1, wherein receiving transaction parameters includes receiving transaction parameters selected from the group consisting of: an interest rate; a maturity; a start date; and a notional amount.

3. The method of claim 1, further comprising:
periodically marking to market an open financial position associated with the interest rate swap.

4. The method of claim 3, where the open financial position is marked to market at least daily.

5. The method of claim 1 further comprising: rolling the open financial position into a second open financial position associated with a second standardized financial product as a function of a maturity of the interest rate swap.

6. The method of claim 5 further comprising: calculating a rate associated with the second standardized financial product.

7. A method of managing financial products, the method comprising:
defining using at least one processor, one or more transaction parameters associated with a negotiated interest rate swap;
identifying, using the at least one processor, an exchange traded financial product, wherein the exchange traded financial product reflects the defined one or more transaction parameters associated with the negotiated interest rate swap;
converting, using the at least one processor, the negotiated interest rate swap associated with the defined one or more transaction parameters to the identified exchange traded financial product; wherein converting further comprises:
calculating, using the at least one processor, a net present value position between the negotiated interest rate swap and the exchange traded financial product; and
clearing, using the at least one processor, the negotiated interest rate swap accord to net present value position through a central clearing party.

8. The method of claim 7, wherein defining the one or more transaction parameters includes defining one or more transaction parameters selected from the group consisting of: an interest rate; a maturity; a start date; and a notional amount.

9. The method of claim 7, further comprising:
periodically marking to market the interest rate swap.

10. The method of claim 7 further comprising:
rolling the interest rate swap into a second interest rate swap associate with a second exchange traded financial product as a function of a maturity of the interest rate swap.

11. The method of claim 7 further comprising:
calculating a rate associated with the second exchange traded financial product.

12. A method of managing financial products, the method comprising:
defining, using at least one processor, at least one transaction parameter on a first date, wherein the at least one transaction parameter is associated with a negotiated interest rate swap;
identifying, using the at least one processor, a standardized exchange traded financial product, wherein the standardized exchange traded financial product begins on a second date, and where the standardized exchange traded financial product reflects the at least one transaction parameters associated with the negotiated interest rate swap;
converting, using the at least one processor, the negotiated interest rate swap associated with the defined at least one transaction parameter to the identified standardized exchange traded financial product; wherein converting further comprises:
calculating, using the at least one processor, a net present value position between the negotiated interest rate swap on the first date and the standardized exchange traded financial product on the second date; and
clearing, using the at least one processor, the net present value position through a clearing party.

13. The method of claim 12, wherein defining at least one transaction parameter includes defining at least one transaction parameter selected from the group consisting of: an interest rate; a maturity; a start date; and a notional amount.

14. The method of claim 12 further comprising:
rolling the second transaction financial product into a third transaction as a function of a maturity.

15. The method of claim 14 further comprising:
calculating a rate associated with the third transaction.

* * * * *